United States Patent
Jung

(10) Patent No.: US 9,689,478 B2
(45) Date of Patent: Jun. 27, 2017

(54) BRAKE PEDAL APPARATUS WITH VARIABLE PEDAL RATIO

(71) Applicant: Hyundai Motor Company, Seoul (KR)

(72) Inventor: Myung Seo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/928,219

(22) Filed: Oct. 30, 2015

(65) Prior Publication Data

US 2016/0160968 A1    Jun. 9, 2016

(30) Foreign Application Priority Data

Dec. 8, 2014  (KR) .................. 10-2014-0174638

(51) Int. Cl.
| | | |
|---|---|---|
| *B60T 7/06* | (2006.01) | |
| *F16H 21/44* | (2006.01) | |
| *G05G 1/30* | (2008.04) | |

(52) U.S. Cl.
CPC ............... *F16H 21/44* (2013.01); *B60T 7/06* (2013.01); *G05G 1/30* (2013.01)

(58) Field of Classification Search
CPC ... B60T 7/04; B60T 7/06; B60T 11/08; B60T 13/26; B60T 13/36; G05G 1/40; G05G 1/405

See application file for complete search history.

(56) References Cited

U.S. PATENT DOCUMENTS

| | | |
|---|---|---|
| 2001/0002556 A1 | 6/2001 | Rixon et al. |
| 2003/0084749 A1 | 5/2003 | Orr et al. |
| 2014/0159475 A1 | 6/2014 | Schmidt |

FOREIGN PATENT DOCUMENTS

| | | | | |
|---|---|---|---|---|
| GB | 2423566 A | * | 8/2006 | ............... B60T 7/06 |
| JP | 3035831 B2 | | 4/2000 | |
| JP | 2003-081071 A | | 3/2003 | |
| JP | 3557921 B2 | | 8/2004 | |
| KR | 10-2002-0064649 A | | 8/2002 | |
| KR | 10-2003-0003807 A | | 1/2003 | |
| KR | 10-0598882 B1 | | 7/2006 | |
| KR | 10-2008-0043974 A | | 5/2008 | |

* cited by examiner

*Primary Examiner* — Thomas C Diaz
(74) *Attorney, Agent, or Firm* — McDermott Will & Emery LLP

(57) ABSTRACT

A brake pedal apparatus with a variable pedal ratio includes a pedal shaft rotatably disposed in a pedal plate. A brake pedal is coupled to the pedal shaft A slider is coupled to the pedal shaft so as to be axially movable relative to the pedal shaft while being capable of rotating together with the pedal shaft. A drive unit may axially move the slider in accordance with a driver's actuation. An adjusting rod is fixed to the slider and is obliquely disposed. A transmission shaft is coupled to the adjusting rod so as to be movable and is coupled to a dual brake valve to operate the dual brake valve. A pedal ratio is adjusted while the adjusting rod moves together with the slider during axial movement of the slider while the transmission shaft is coupled to the dual brake valve.

7 Claims, 10 Drawing Sheets

- Prior Art -

Deceleration & stroke

Deceleration & effort

Pedal ratio: intermediate

Pedal ratio: maximum (driver pedal stroke longest)

Cylinder left and right balance

Pedal ratio decrease: left cylinder decompression

Pedal ratio increase: right cylinder decompression

BRAKE PEDAL APPARATUS WITH VARIABLE PEDAL RATIO

CROSS-REFERENCE TO RELATED APPLICATION

This application claims under 35 U.S.C. §119(a) the benefit of priority to Korean Patent Application No. 10-2014-0174638 filed on Dec. 8, 2014, the entire contents of which are incorporated herein by reference.

TECHNICAL FIELD

The present disclosure relates to a brake pedal apparatus for a vehicle. More particularly, it relates to a brake pedal apparatus which can improve braking feeling felt by a driver through a brake pedal during braking operation.

BACKGROUND

Generally, in large commercial vehicles such as trucks and buses having great weight, an air brake system having excellent braking force, less failure, and easy handling has been used.

An air brake system utilizes air pressure of the compressed air so as to obtain a large braking force by small pedal stepping force. In such a brake system, air compressed by an air compressor is stored in an air tank, two inlets of a dual brake valve are connected to the air tank, two outlets of the dual brake valve are connected to the brake chambers of the front and rear wheels, and a front wheel brake unit and a rear wheel brake unit are connected to the output shafts of each brake chamber.

The dual brake valve is a valve which supplies the compressed air from the air tank to the brake chambers of the front and rear wheels when a driver steps on the brake pedal, and has a double structure which simultaneously connects the flow of air to the front and rear wheels or blocks the flow or air.

In the case of an air brake system of a large commercial vehicle, two independent pressure supply circuits are provided for rules of safety regulations to independently transfer the air pressure to the front and rear wheels through a dual brake valve when braking the vehicle.

Therefore, the air pressure is independently transmitted to the circuit of the front wheel brake unit and the circuit of the rear wheel brake unit via the dual brake valve or blocked at the same time, and even if an error occurs in any one circuit of them, the other circuit is still maintained to ensure the braking safety.

On the other hand, when the driver steps on the brake pedal to perform a braking input, the feeling received via the brake pedal is referred to as a braking feeling, and it is possible to feel the braking feeling such as hard, fully-sinking, pushing, and sticking via the brake pedal.

Such braking feeling is determined by a relation, such as a control feeling (pedal stroke and vehicle deceleration) felt by the pedal stroke to the vehicle deceleration and an effective feeling (pedal effort and vehicle deceleration) felt by a pedal effort to the vehicle deceleration.

Braking of the large commercial vehicle to which the air brake system is applied as described above uses the air pressure as a boost mediator, and a specific pedal ratio is determined in consideration of the characteristics (pedal stroke & effort & pressure) of the dual brake valve and the preferred braking feeling of the driver at the time of design of the vehicle.

FIG. 1 is a perspective view of a brake pedal module, which illustrates a brake pedal 1 operated by a driver for braking input, a dual brake valve 2 which controls the air supply/block to the front wheel and rear wheel brake chambers from the air tank in conjunction with the operation of the brake pedal 1, a pedal plate 3 to which the brake pedal 1 and the dual brake valve 2 are mounted, and a pedal shaft 4 which is rotatably mounted to the pedal plate 3 and is coupled so as to support the brake pedal 1.

When a driver operates the brake pedal 1, a pedal operation force is transmitted to the dual brake valve 2 through a transmission shaft 5, and thus, the actuation of the dual brake valve 2 is performed to transmit the compressed air from the air tank to the brake chambers of the front and rear wheels by the movement of the inner piston.

FIG. 2 is a diagram illustrating a pedal ratio of the brake pedal, in which, a value of A/B is a pedal ratio, and the pedal ratio is fixed to a specific value depending on the vehicle model.

The braking feeling differs depending on the pedal ratio, and FIGS. 3A-3B illustrate that the braking control feeling felt according to a relationship between the pedal stroke and the vehicle deceleration of the braking feeling, and the braking effective feeling felt according to a relationship between the pedal effort and the vehicle deceleration are different depending on the vehicle model due to the fixed pedal ratio.

However, since the pedal ratio is fixed to a specific value depending on the vehicle model, there may be dissatisfaction in the braking feeling depending on the user, and in particular, a large number dissatisfactions of the control feeling (pedal stroke and vehicle deceleration) in the braking feeling have been raised.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

In one aspect, an object of the present invention is to provide a brake pedal apparatus which is capable of improving the braking feeling felt by a user through the brake pedal during the braking.

Further, in another aspect, embodiments of the present invention provide a brake pedal apparatus which is configured so that a driver can personally select and adjust the braking control feeling (the pedal stroke and the vehicle deceleration) felt through a simple actuation.

In order to achieve the above-mentioned objects, according to the present invention, there is provided a brake pedal apparatus with a variable pedal ratio which includes a pedal shaft which is rotatably disposed in a pedal plate. A brake pedal is coupled to the pedal shaft and is configured to rotate the pedal shaft while rotationally moving about the pedal shaft, in certain embodiments as a hinge shaft, during the driver's operation of the brake. A slider is coupled to the pedal shaft so as to be axially movable relative to the pedal shaft while being capable of rotating together with the pedal shaft. A drive unit is configured to axially move the slider in accordance with the driver's actuation. An adjusting rod is fixed to the slider and is obliquely disposed so that a distance between the adjusting rod and the pedal shaft increases in the axial direction of the pedal shaft. A transmission shaft is coupled to the adjusting rod so as to be movable relative to the adjusting rod in an axial direction of the adjusting rod and is coupled to the dual brake valve at an end portion of the transmission shaft tto operate the dual brake valve during vertical movement of the transmission shaft depending on the driver's operation of the brake, A pedal ratio is adjusted while the adjusting rod moves together with the slider, during axial movement of the slider while the transmission shaft is coupled to the dual brake valve.

In certain embodiments, the slider is an external pipe coupled to an outer circumference of the pedal shaft by a serration coupling structure or a key and key groove coupling structure.

In certain embodiments, the slider may have two opposing sides in the axial direction of the pedal shaft, support rods may extend from both opposing sides of the slider, and the adjusting rod may be connected and disposed between the support rods In certain embodiments, the transmission shaft may vertically extend from the adjusting rod, the end portion of the transmission shaft coupled to the dual brake valve may be a lower end portion of the transmission shaft, and the transmission shaft may be rotatably coupled to the adjusting rod.

In certain embodiments, the drive unit may include a pneumatic cylinder having a cylinder body and a piston rod, the cylinder body may be fixedly mounted to the pedal plate, and the piston rod may be coupled to the slider.

In certain embodiments, the drive unit may further include an air tank filled with compressed air, an air supply line through which the compressed air may be supplied to the pneumatic cylinder from the air tank, and a control valve switch configured to control the supply of air to the pneumatic cylinder to adjust forward and backward movement positions of the piston rod.

In certain embodiments, the control valve switch may include a valve means configured to drive the pneumatic cylinder by controlling the flow of air from the air supply line, and the control valve switch may be a mechanical button operation valve switch configured so that the driver's actuation of the valve means can be performed.

Thus, according to the brake pedal apparatus of embodiments of the present invention, since it is configured so as to be able to selectively adjust the pedal ratio so that the driver is able to feel the desired braking control feeling through a simple actuation, it is possible to contribute to an improvement in braking feeling of the driver and an enhancement of vehicle merchantability.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
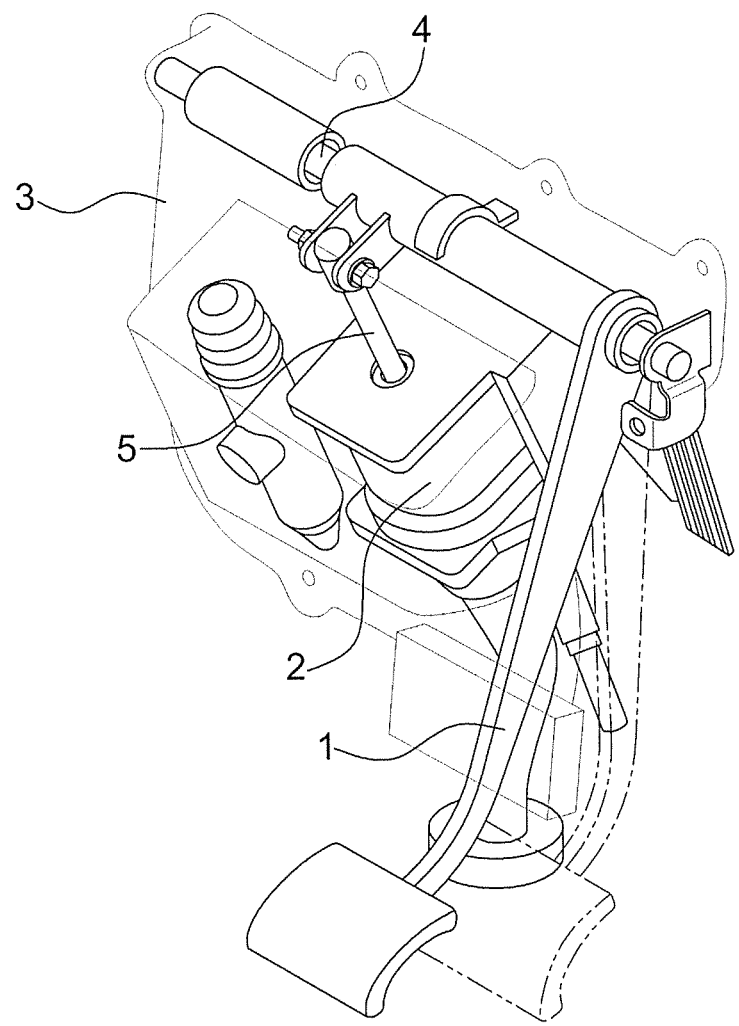
FIG. 1 is a perspective view illustrating a conventional brake pedal module.
Figure 2:
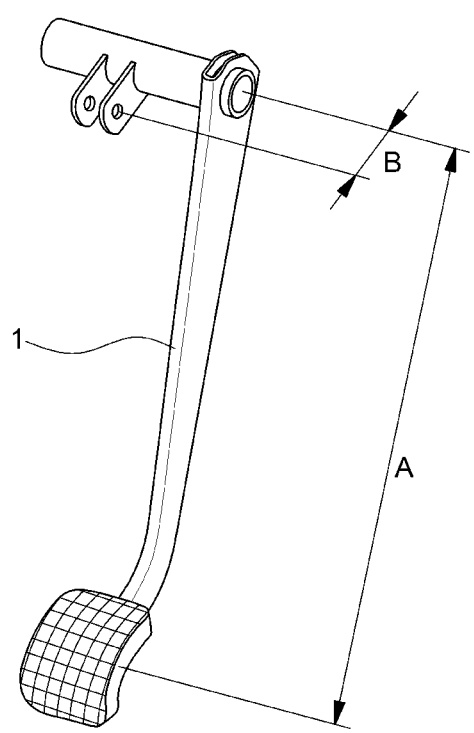
FIG. 2 is a diagram illustrating a pedal ratio of a brake pedal.
Figure 3A:
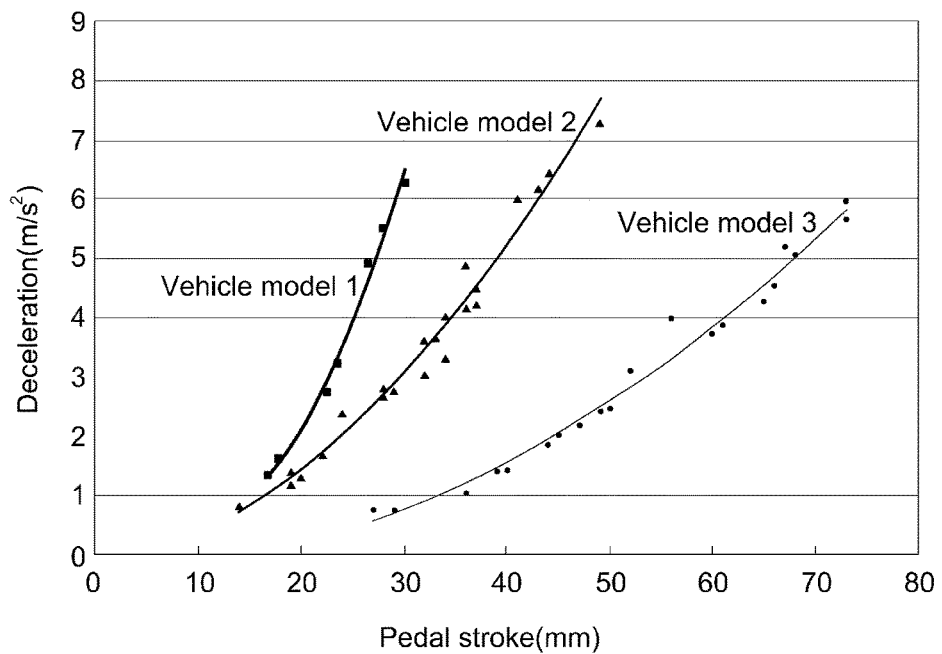
FIGS. 3A-3B are diagrams illustrating the conventional problem.
Figure 3B:
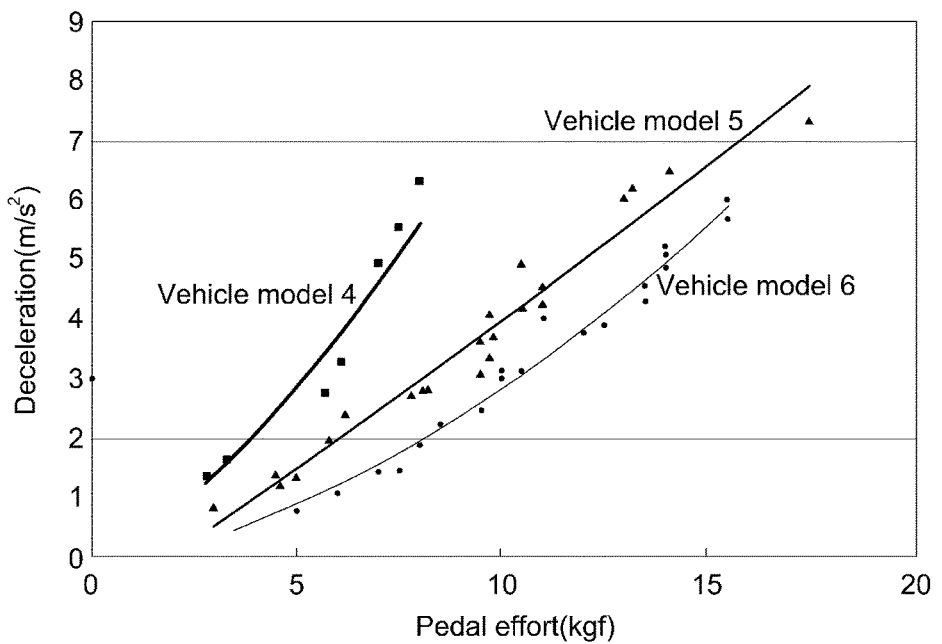

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, certain embodiments of the present invention will be described in detail so that they can be easily performed by a person having skilled in the art with reference to the accompanying drawings.

Embodiments of the present invention provide a brake pedal apparatus which is configured so that the driver can personally adjust the braking control feeling (the pedal stroke and the vehicle deceleration) felt by the driver.

The brake pedal apparatus according to certain embodiments of the present invention is configured so that a driver can adjust the pedal ratio of the brake pedal, and in certain embodiments, an initial position of the brake pedal is always maintained at the same level, but the apparatus is configured so that the driver can adjust the pedal stroke to be longer or shorter by adjusting the pedal ratio via the actuation.

Figure 4:
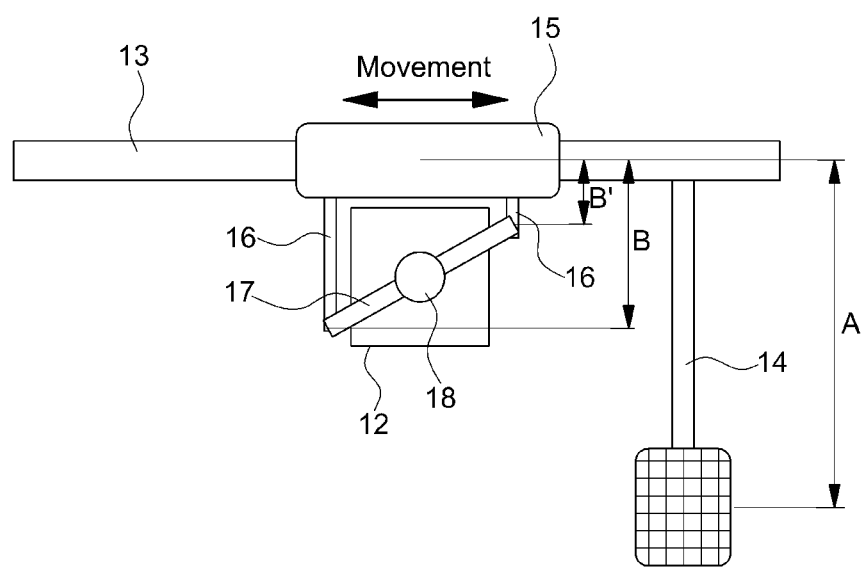
FIG. 4 is a plan view illustrating a brake pedal apparatus according to an embodiment of the present invention.
Figure 5A:
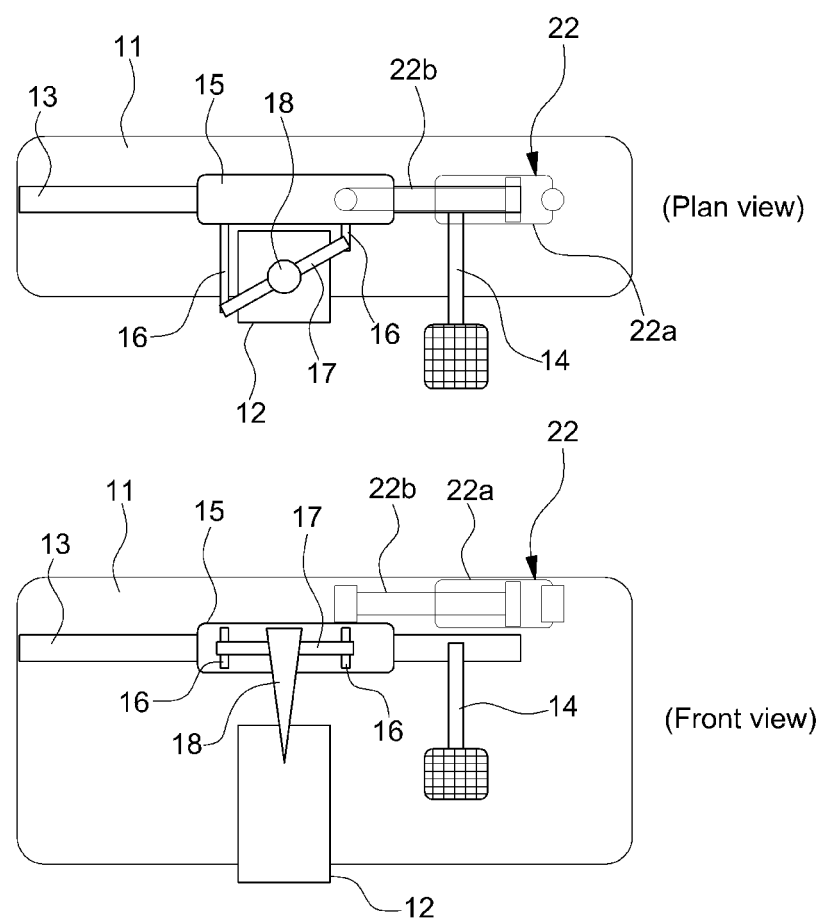
FIGS. 5A-5C are diagrams illustrating an operating state in which the pedal ratio is variable in the brake pedal apparatus according to an embodiment of the present invention.
Figure 5B:
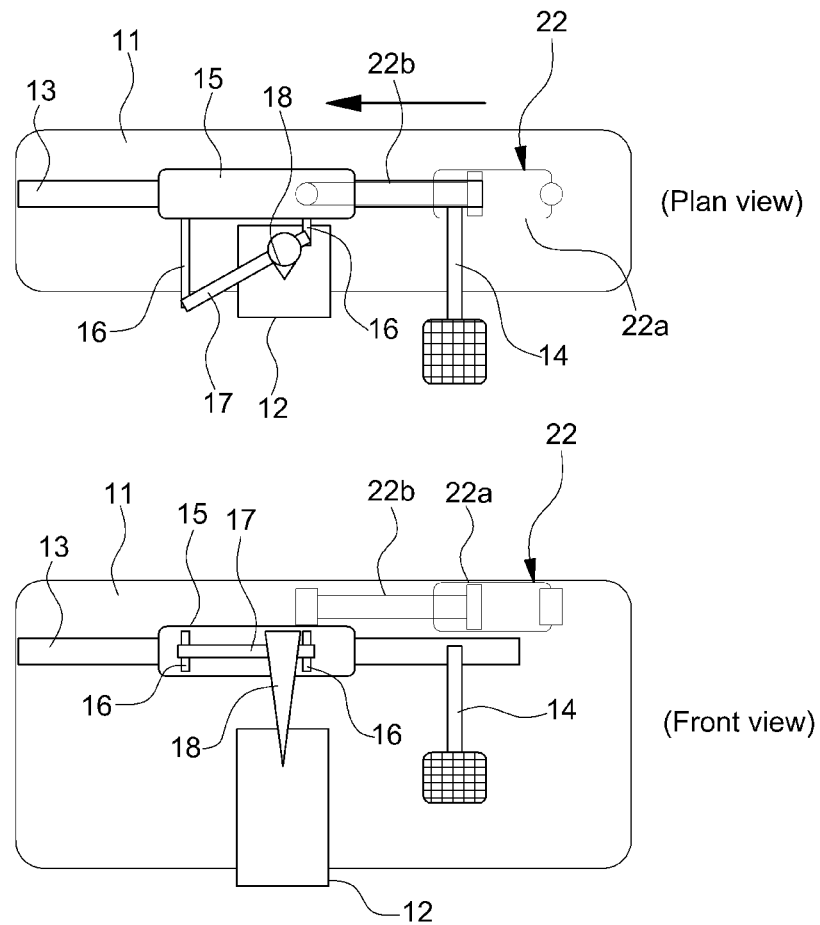
Figure 5C:
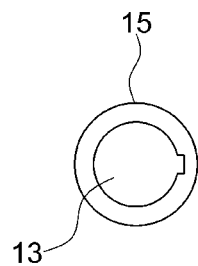

FIG. 4 is a plan view illustrating the brake pedal apparatus according to an embodiment of the present invention, and FIGS. 5A-C are diagrams illustrating an operating state in which the pedal ratio is variable in the brake pedal apparatus according to an embodiment of the present invention.

As illustrated, a dual brake valve 12 is fixedly mounted to the pedal plate 11, and additionally, a pedal shaft 13 is rotatably coupled to the pedal plate 11 on the upper side of the dual brake valve 12.

The pedal shaft 13 is coupled to the pedal plate 11 so as to be horizontally disposed long in a lateral transverse direction, a brake pedal 14 is coupled to the pedal shaft 13 so that the brake pedal 14 and the pedal shaft 13 are integrally operated when a driver operates the brake pedal.

That is, when the brake pedal 14 is vertically rotated about the pedal shaft 13 as a rotary center during driver's operation, the pedal shaft 13 is rotated in the pedal plate 11.

A slider 15 is coupled to the pedal shaft 13. In certain embodiments, the slider 15 may be an external pipe coupled to the outer circumference of the pedal shaft 13 by a serration coupling structure or a key and key groove coupling structure (see FIG. 5(c)), and the external pipe 15 may be adapted to be able to rotate integrally with the pedal shaft 13.

In certain embodiments, the external pipe 15 is movable in the axial direction of the pedal shaft 13 on the outer circumference of the pedal shaft 13 by the above-described coupling structure, and is in the form of a slider which capable of moving axially along the pedal shaft 13, while being rotatable together with the pedal shaft 13.

Thus, the external pipe 15 is axially moved on the outer circumference of the pedal shaft 13 and its position is adjusted, and thus, the pedal ratio change is performed.

In certain embodiments, on both sides in the lengthwise direction of the external pipe 15, support rods 16 which horizontally extend in the lateral direction are disposed, and an adjusting rod 17, which is connected in an oblique direction when viewed on a plane, is connected and installed between both support rods 16. In certain embodiments, the adjusting rod 17 may have a circular cross-section.

The adjusting rod 17 is installed in the oblique direction so that the distance between the adjusting rod 17 and the external pipe 15 linearly changes along its lengthwise direction, that is, as it goes in the lateral direction.

Consequently, the adjusting rod 17 has a structure which is disposed in the oblique direction so that the distance from the pedal shaft increases as one measures it at various points along the axial direction of the pedal shaft 13, and a transmission shaft 18 coupled so as to be slide-movable along the axial direction is extended and installed on the adjusting rod 17 in the vertical direction relative to the adjusting rod 17.

In certain embodiments, the transmission shaft 18 serves to transmit the operation force of the brake pedal 14 transmitted through the pedal shaft 13, the external pipe 15, the support rod 16 and the adjusting rod 17 to the dual brake valve 12 so that the dual brake valve 12 can be operated.

In certain embodiments, the transmission shaft 18 is rotatably mounted on the adjusting rod 17, and the lower end portion of the transmission shaft 18 is inserted by seating inside a coupling groove 12a formed on the upper portion of the dual brake valve 12. Thus, the transmission shaft 18 is coupled to the dual brake valve 12 so that the operation force can be transmitted.

Further, in certain embodiments, when the brake pedal 14 is operated up and down, the pedal shaft 13 and the external pipe 15 are rotated, and when the external pipe 15 is rotated, the transmission shaft 18 moves up and down, so that the force transmitted by the vertical movement of the transmission shaft 18 vertically moves an interior piston (indicated by reference numeral 12b in FIG. 6) of the dual brake valve 12 to allow the dual brake valve 12 to be operated.

That is, the operation of the dual brake valve 12 for controlling the supplying/blocking of the air to the brake chambers of the front and rear wheels from the air tank 21 is performed in conjunction with the operation of the brake pedal 14.

Further, in certain embodiments, in a state in which the lower end portion of the transmission shaft 18 is coupled to the dual brake valve 12 so as to be able to transmit the pedal operation force, and the upper end of the transmission shaft 18 is coupled onto the adjusting rod 17, when the adjusting rod 17 of the oblique direction together with the external pipe 15 is moved in the lateral direction in the drawings, the transfer shaft 18, in which the position in the lateral position is fixed by the dual brake valve 12, has to be able to rotate on the adjusting rods 17.

Therefore, during movement of the external pipe 15 and the adjusting rod 17 for the variable pedal ratio, the transmission shaft 18 is coupled so that the relative axial movement to the adjusting rod 17 and the rotation about the adjusting rod 17 as a rotary center are enabled.

Figure 6:
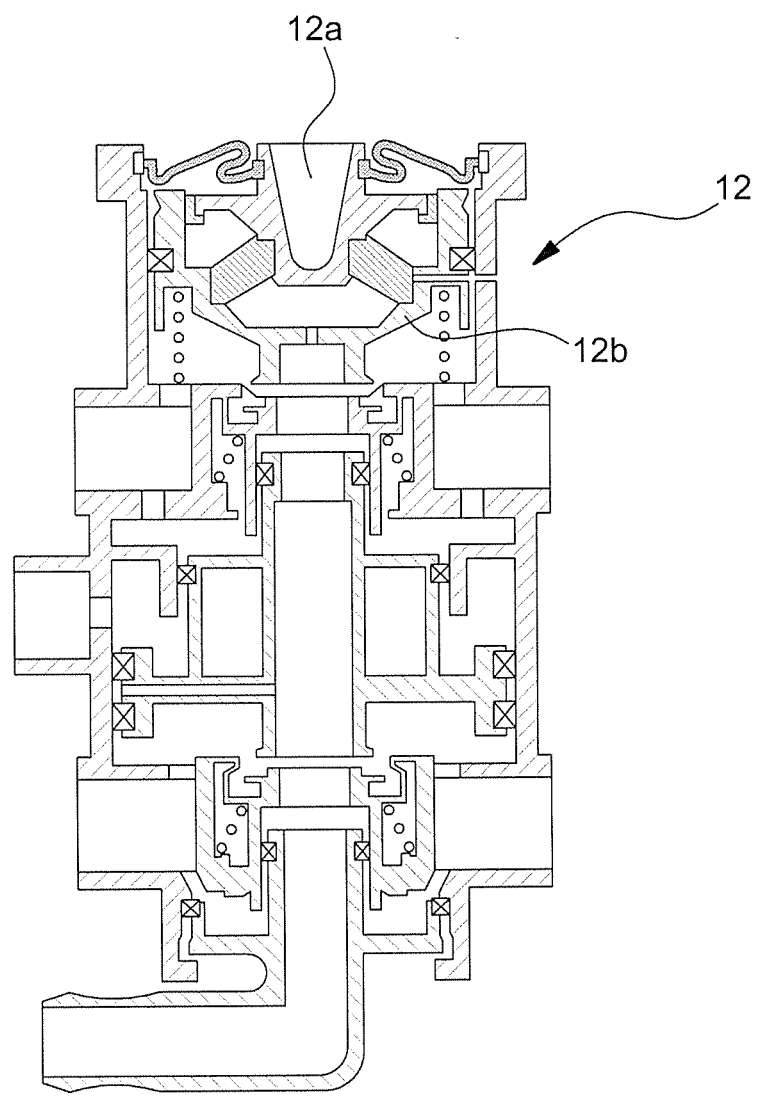
FIG. 6 is a diagram illustrating an example of a dual brake valve.

On the other hand, FIG. 6 is a diagram illustrating an example of the dual brake valve, since an internal configuration of the dual brake valve is a known technical matter, the detailed description thereof will not be provided. The dual brake valve illustrated in the drawings is a just one example, and the present invention is not limited thereto.

As illustrated, in certain embodiments, a coupling groove 12a may be formed in the upper portion of the normal dual brake valve 12 so that the transmission shaft 18 for transmitting the operating force of the brake pedal 14 can be coupled. The lower end portion of the transmission shaft 18 is inserted and coupled to the coupling groove 12a, and thus, force transmitted by the vertical movement of the transmission shaft 18 vertically moves the piston 12b.

On the other hand, in certain embodiments, the brake pedal apparatus of the present invention includes an actuator 22 which moves the external pipe 15 (slider) in the axial direction of the pedal shaft, when controlling the pedal ratio and the braking control feeling.

The actuator 22 is driven in accordance with the driver's actuation, for example, the valve switching operation of the driver to axially move the external pipe 15 to an adjusted position, so that the pedal ratio adjustment is performed thereby, and the pedal stroke and the braking control feeling felt by the driver according to the pedal stroke can be controlled by the pedal ratio control.

Figure 7:
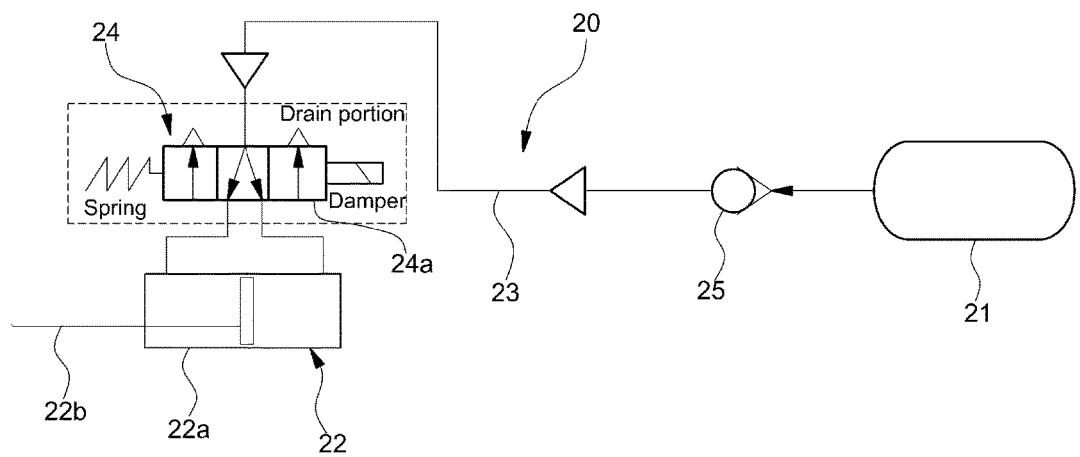
FIG. 7 is a schematic diagram illustrating a drive unit including an actuator in the brake pedal apparatus according to an embodiment of the present invention.

FIG. 7 is a schematic diagram illustrating a driving device including an actuator in the brake pedal apparatus according to the embodiment of the present invention, and as illustrated, in certain embodiments, the actuator 22 may be a pneumatic cylinder 22 that is driven by the air pressure supplied from the air tank 21 of the vehicle.

In certain embodiments, a cylinder body 22a of the pneumatic cylinder 22 is fixedly mounted to the pedal plate 11, and a leading end portion of a piston rod 22b adapted to move back and forth in the cylinder body 22a by the air pressure supplied from the air tank 21 to the cylinder body 22a is fixed to the external pipe 15.

At this time, the pneumatic cylinder 22 is mounted so as to be able to move the external pipe 15 on the pedal shaft 13 in the axial direction, depending on the forward and backward operation of the piston rod 22b.

Referring to FIG. 7, the drive unit 20 is a device which moves external pipe (slider) 15 in the axial direction in accordance with the driver's actuation, and includes an air tank 21 filled with high-pressure compressed air, an actuator 22, which in certain embodiments is a pneumatic cylinder 22 in which the forward and backward motion of the piston rod 22b is performed by the pressure of the compressed air supplied from the air tank 21, an air supply line 23 through which the compressed air is supplied from the air tank 21 to the pneumatic cylinder 22, and a control valve switch 24 which controls the supply of air to the pneumatic cylinder 22 to adjust the forward and backward positions of the piston rod 22b.

Reference numeral 25 in FIG. 7 is a check valve which is installed in the air supply line 23 and is intended to provide the system safety and protection which prevents the compressed air of the brake pedal apparatus including the pneumatic cylinder 22 from having an effect on the pressure change of another pneumatic device.

The large commercial vehicles are equipped with an air tank which is always filled with high-pressure compressed air for a vehicle pneumatic system which utilizes the high-pressure compressed air, the compressed air filled in the air tank 21 is used as a power source for driving the actuator in the present invention.

In certain embodiments, the control valve switch 24 may be a mechanical button operation switch that is configured so that the driver's actuation of the valve means 24a can be performed, while including a valve means 24a for controlling the flow of air so that the pneumatic cylinder 22 is driven in the air supply line 23. The control valve switch 24 adjusts the forward and backward positions of the piston rod 22b in the pneumatic cylinder 22 during actuation.

Figure 8A:
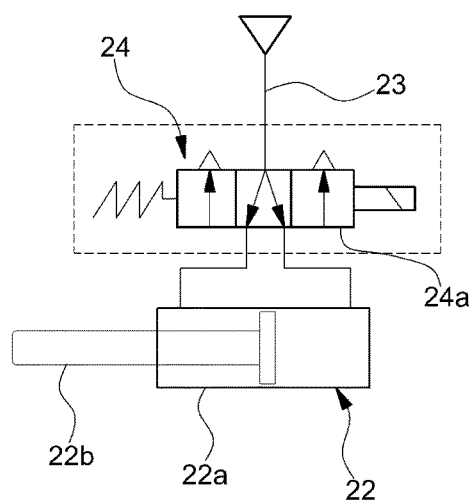
FIGS. 8A-8C are diagrams schematically illustrating an operating state of a pneumatic cylinder in a brake pedal apparatus according to an embodiment of the present invention.
Figure 8B:
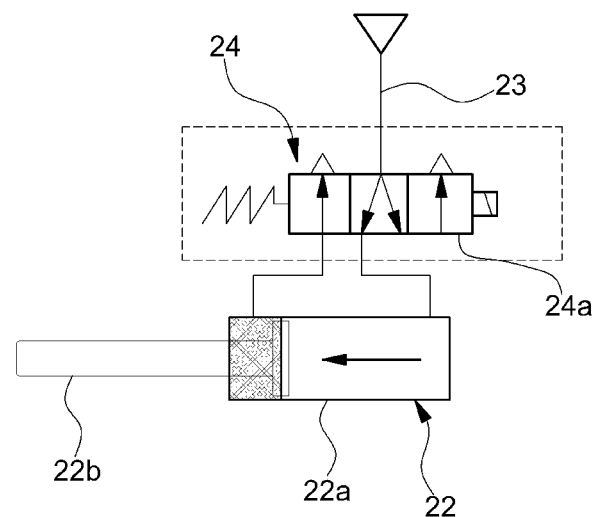
Figure 8C:
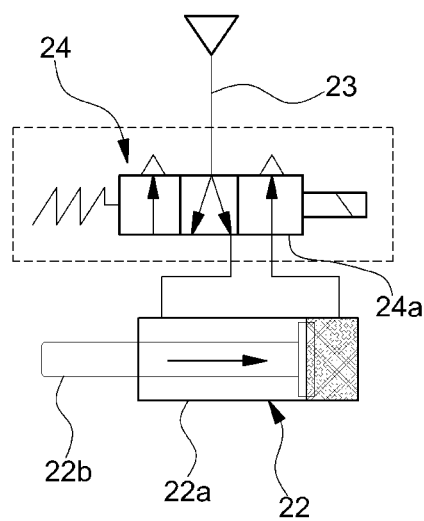

FIGS. 8(a) to 8(c) are diagrams illustrating the operating states of the pneumatic cylinder 22. As illustrated, a position of the valve means 24a of the control valve switch 24 is determined in accordance with the driver's actuation, and since the supply and exhaust control of air to the pneumatic cylinder 22 is performed depending on the position of the valve means 24a at this time, the forward and backward positions of the piston rod 22b can be regulated.

As in FIG. 8(b), as the piston rod 22b moves forward, the pedal ratio increases, and as in FIG. 8(c), as the piston rod 22b moves backward, the pedal ratio decreases Hereinafter, the operating state in which the pedal ratio is adjusted will be described referring to FIGS. 5(a) and 5(b).

FIG. 5(a) illustrates a state in which the pedal ratio is intermediate, and when the pneumatic cylinder 22 is operated and the piston rod 22b moves forward at this state, the external pipe 15 moves forward to the left side in the drawing on the pedal shaft 13.

At this time, the adjusting rod 17 is moved together to the left direction in the drawing, the transmission shaft 18 coupled to the dual brake valve 12 is pulled toward the pedal shaft 13 serving as a hinge shaft of the brake pedal 14 by the inclined arrangement shape of the adjusting rod 17, and the pedal ratio increases.

In this manner, when the pedal ratio increases, as compared to the state of FIG. 5(a), the stroke of the brake pedal 14 for achieving the same vehicle deceleration increases.

FIG. 5(b) illustrates the state in which the pedal ratio is adjusted to the greatest level (pedal ratio in FIG. 4=A/B').

On the other hand, when the pneumatic cylinder 22 operates and the piston rod 22b moves backward in the state of FIG. 5(a), the external pipe 15 moves backward to the right side in the drawing on the pedal shaft 13.

At this time, the adjusting rod 17 is moved together to the right direction in the drawing, the transmission shaft 18 coupled to the dual brake valve 12 is away from the pedal shaft 13 side serving as the hinge shaft of the brake pedal 14 by the inclined arrangement shape of the adjusting rod 17, and the pedal ratio decreases.

In this way, when the pedal ratio decreases, the stroke of the brake pedal 14 for achieving the same vehicle deceleration decreases as compared to the state of FIG. 5(a).

Further, at the maximum backward movement position of the piston rod 22b, that is, in a state in which the external pipe 15 and the adjusting rod 17 are moved to the rightmost side of FIGS. 5(a) and 5(b), the pedal ratio becomes A/B in FIG. 4, and thus becomes the smallest.

Figure 9:
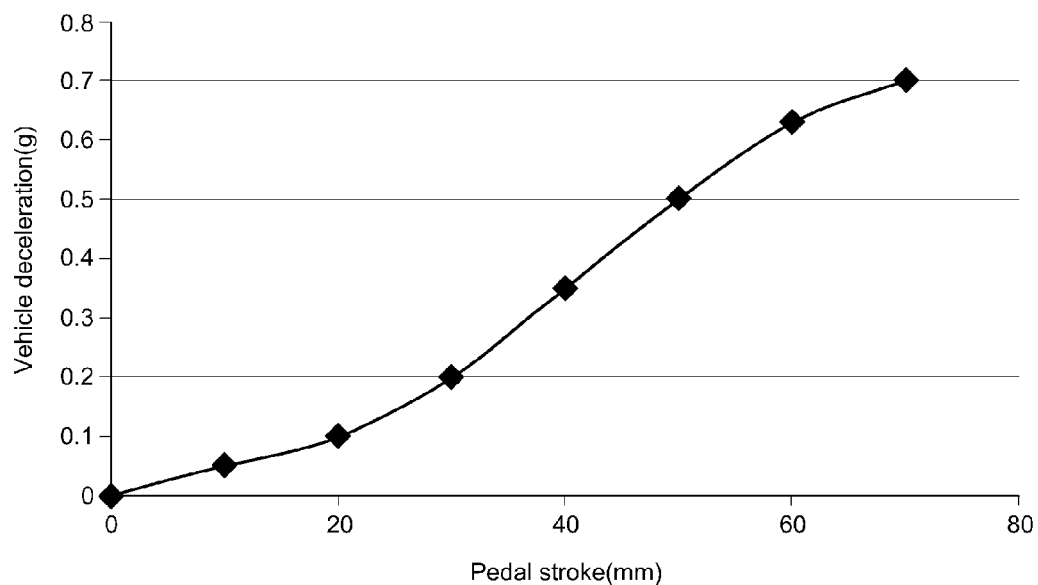
FIG. 9 is a diagram illustrating a vehicle deceleration depending on the pedal stroke.
Figure 10:
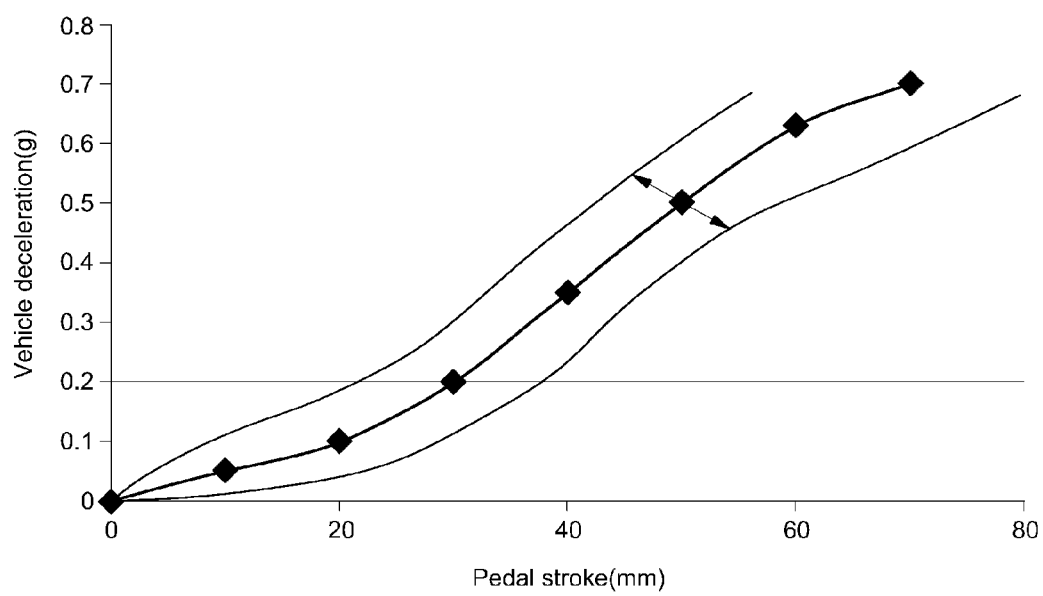
FIG. 10 is a diagram illustrating that the braking feeling can be adjusted and selected in the brake pedal apparatus according to an embodiment of the present invention.

FIG. 9 is a diagram illustrating the vehicle deceleration depending on the pedal stroke, and FIG. 10 is a diagram illustrating that the braking feeling can be adjusted and selected depending on the driver's preference in the brake pedal apparatus of the present invention.

As described above, a driver is able to adjust the pedal ratio and the braking control feeling associated therewith to the desired levels, by actuating the pneumatic cylinder 22 through the actuation of the control valve switch 24 to adjust the forward and backward positions of the piston rod 22b and the positions of the external pipe 15 and the adjusting rod 17.

While the embodiments of the present invention have been described in detail above, the scope of the invention is not limited thereto, and various modifications and improvements of the person skilled in the art, which utilizes the basic concept of the invention as defined by the scope of the following claims, are also included in the scope of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A brake pedal apparatus with a variable pedal ratio comprising:
   a pedal shaft rotatably disposed in a pedal plate;
   a brake pedal coupled to the pedal shaft and configured to rotate the pedal shaft while rotationally moving about the pedal shaft during a drivers operation of the brake;
   a slider coupled to the pedal shaft so as to be axially movable relative to the pedal shaft while being capable of rotating together with the pedal shaft;
   a drive unit configured to axially move the slider in accordance with a driver's actuation;
   an adjusting rod fixed to the slider and is obliquely disposed so that a distance between the adjusting rod and the pedal shaft increases in an axial direction of the pedal shaft; and
   a transmission shaft coupled to the adjusting rod so as to be movable relative to the adjusting rod in an axial direction of the adjusting rod and coupled to a dual brake valve at an end portion of the transmission shaft to operate the dual brake valve during vertical movement of the transmission shaft depending on the driver's operation of the brake, wherein a pedal ratio is adjusted while the adjusting rod moves together with the slider, during axial movement of the slider while the transmission shaft is coupled to the dual brake valve.

2. The brake pedal apparatus of claim 1, wherein the slider is an external pipe coupled to an outer circumference of the pedal shaft by a serration coupling structure or a key and key groove coupling structure.

3. The brake pedal apparatus of claim 1, further comprising support rods, wherein the slider has two opposing sides in the axial direction of the pedal shaft, the support rods extend from both opposing sides of the slider, and the adjusting rod is connected and disposed between the support rods.

4. The brake pedal apparatus of claim 1, wherein the transmission shaft vertically extends from the adjusting rod, the end portion of the transmission shaft coupled to the dual brake valve is a lower end portion of the transmission shaft, and the transmission shaft is rotatably coupled to the adjusting rod.

5. The brake pedal apparatus of claim 1, wherein the drive unit comprises a pneumatic cylinder having a cylinder body and a piston rod, the cylinder body is fixedly mounted to the pedal plate, and the piston rod is coupled to the slider.

6. The brake pedal apparatus of claim 5, wherein the drive unit further comprises:
an air tank filled with compressed air;
an air supply line through which the compressed air is supplied to the pneumatic cylinder from the air tank; and
a control valve switch configured to control the supply of air to the pneumatic cylinder to adjust forward and backward movement positions of the piston rod.

7. The brake pedal apparatus of claim 6, wherein the control valve switch comprises a valve means configured to drive the pneumatic cylinder by controlling the flow of air from the air supply line, and the control valve switch is a mechanical button operation valve switch configured so that the driver's actuation of the valve means can be performed.

* * * * *